US006957077B2

(12) United States Patent
Dehlin (10) Patent No.: US 6,957,077 B2
(45) Date of Patent: Oct. 18, 2005

(54) SYSTEM AND METHOD FOR ENABLING INSTANT MESSAGING ON A MOBILE DEVICE

(75) Inventor: Joel P. Dehlin, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 558 days.

(21) Appl. No.: 10/140,389

(22) Filed: May 6, 2002

(65) Prior Publication Data

US 2004/0203942 A1 Oct. 14, 2004

(51) Int. Cl.⁷ .............................................. H04Q 7/20
(52) U.S. Cl. .................... 455/466; 445/412.2; 709/206
(58) Field of Search ............................ 455/466, 412.1, 455/414.1, 418, 422.1, 445, 550.1; 709/206, 709/204, 207; 715/531, 523

(56) References Cited

U.S. PATENT DOCUMENTS

| | | | |
|---|---|---|---|
| 6,263,212 B1 * | 7/2001 | Ross et al. .................. | 455/466 |
| 6,377,798 B1 | 4/2002 | Shaffer et al. .............. | 455/426 |
| 6,707,890 B1 * | 3/2004 | Gao et al. ................. | 379/88.12 |
| 6,714,793 B1 * | 3/2004 | Carey et al. ................ | 455/466 |
| 6,760,580 B2 * | 7/2004 | Robinson et al. ........... | 709/204 |
| 6,816,578 B1 * | 11/2004 | Kredo et al. ............. | 379/88.17 |
| 2002/0035605 A1 | 3/2002 | McDowell et al. ......... | 709/206 |
| 2002/0084888 A1 * | 7/2002 | Jin ............................ | 340/7.21 |
| 2002/0155826 A1 * | 10/2002 | Robinson et al. ........... | 455/466 |
| 2002/0165000 A1 | 11/2002 | Fok ............................ | 455/466 |
| 2003/0027563 A1 * | 2/2003 | Herle et al. ................. | 455/419 |
| 2003/0045273 A1 * | 3/2003 | Pyhalammi et al. ........ | 455/412 |
| 2003/0163533 A1 * | 8/2003 | McNamara et al. ........ | 709/206 |
| 2003/0229670 A1 * | 12/2003 | Beyda ........................ | 709/206 |
| 2004/0121785 A1 * | 6/2004 | Vance et al. ................ | 455/466 |
| 2005/0108348 A1 * | 5/2005 | Lee ............................ | 709/207 |

FOREIGN PATENT DOCUMENTS

| | | |
|---|---|---|
| EP | 1 130 869 A1 | 9/2001 |
| WO | WO 01/67622 A2 | 9/2001 |

* cited by examiner

Primary Examiner—Temica Beamer
Assistant Examiner—Kamran Afshar
(74) Attorney, Agent, or Firm—Merchant & Gould P.C.

(57) ABSTRACT

A method and system for enabling instant messaging on mobile devices is provided. A customized SMS message is created that awakens the mobile device so that instant messaging may be initiated. Once the mobile device is awakened by the customized SMS message, the mobile device responds to the customized SMS message and initiates processing. Based on information obtained, the mobile device creates a reply customized SMS message. The reply customized SMS message is translated into a reply instant message, which is transmitted over a persistent Internet connection to the sender responsible for awakening the mobile device. Alternatively, the mobile device may respond by creating an Internet connection and establishing a chat session over the Internet connection. The chat session allows the exchange of instant messages between the mobile device and the sender responsible for awakening the mobile device.

11 Claims, 7 Drawing Sheets

SYSTEM AND METHOD FOR ENABLING INSTANT MESSAGING ON A MOBILE DEVICE

FIELD OF THE INVENTION

The present invention relates generally to mobile computing, and more particularly to enabling instant messaging on a mobile device.

BACKGROUND OF THE INVENTION

Instant messaging between individuals has become very popular. In general, instant messaging allows individuals to establish private chat sessions with each other through their respective personal computers. Typically, each individual creates a screen name and submits the screen name to an instant messaging system that stores the screen name in a database. Persons, who are interested in chatting with a particular individual, can add the screen name associated with that particular individual to their private list. Then, when any of the individuals listed on their private list are online, the instant messaging system sends an alert indicating that the individual is online and is available for chatting. A chat session may then be initiated through the Internet for chatting with the desired individual.

This instant messaging system works well for individuals using computing devices that maintain persistent connections to the Internet. These individuals may register their computing devices with the instant messaging system and inform the instant messaging system of their state (e.g., "online"). However, the instant messaging system does not work for mobile individuals using mobile devices. For one reason, mobile individuals do not typically maintain a persistent Internet connection on their mobile device for any significant duration. The reason for not maintaining a persistent Internet connection is typically driven by cost and battery-life considerations associated with their mobile device. For example, if a mobile device maintains a persistent Internet connection, its battery would most likely be expended after only a few hours. This would make the mobile device useless for other uses (e.g., phone conversations, emails, etc.).

Given the desirability of instant messaging, there is a need to extend instant messaging to mobile individuals using mobile devices.

SUMMARY OF THE INVENTION

The present invention provides a method and system that enables mobile devices to send and receive instant messages. Because mobile devices do not typically maintain a persistent Internet connection, the mobile devices are not available to receive instant messages. In accordance with the present invention, a customized SMS message is created that awakens the mobile device so that instant messaging may be initiated. Once the mobile device is awakened by the customized SMS message, the mobile device may respond by transmitting a reply customized SMS message. The reply customized SMS message is transmitted over a cellular network. After the reply customized SMS message is translated into a reply instant message, the reply instant message is transmitted over a persistent Internet connection to the sender responsible for awakening the mobile device with the customized SMS message. Alternatively, the mobile device may respond by creating an Internet connection and establishing a chat session over the Internet connection. The chat session allows the sender responsible for awakening the mobile device and the mobile device to exchange instant messages over the Internet connection.

DETAILED DESCRIPTION OF THE PREFERRED EMBODIMENT

The present invention is directed at providing a system and method for enabling instant messaging on a mobile device. Briefly described, the present invention creates a customized Short Message Service (SMS) message that is transmitted to a mobile device. The customized SMS message is based on an instant message transmitted by a sender. Upon receipt of the customized SMS message, the mobile device determines that the customized SMS message is associated with an instant message. Based on this determination, the mobile device "wakes up" and responds to the instant message. The mobile device may respond by transmitting a reply customized SMS message that is addressed to the sender. Alternatively, the mobile device may respond by creating an Internet connection and establishing a chat session with the sender. These and other aspects of the invention will become apparent to those skilled in the art after reading the following detailed description.

Figure 1:
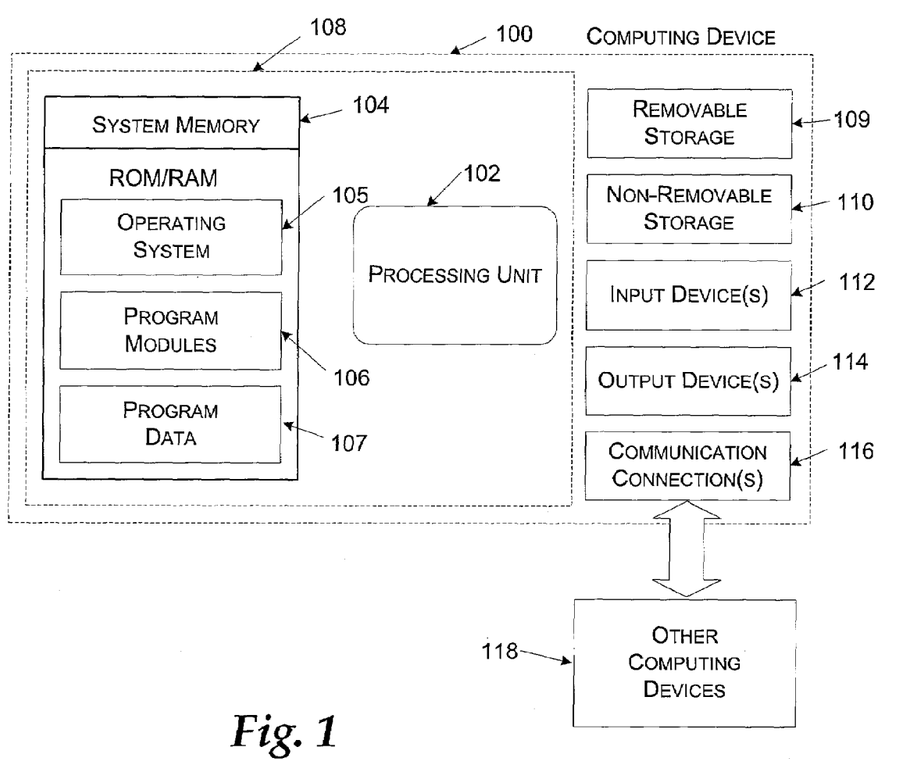
FIG. 1 illustrates an exemplary computing device that may be used in one exemplary embodiment of the present invention.
Figure 2:
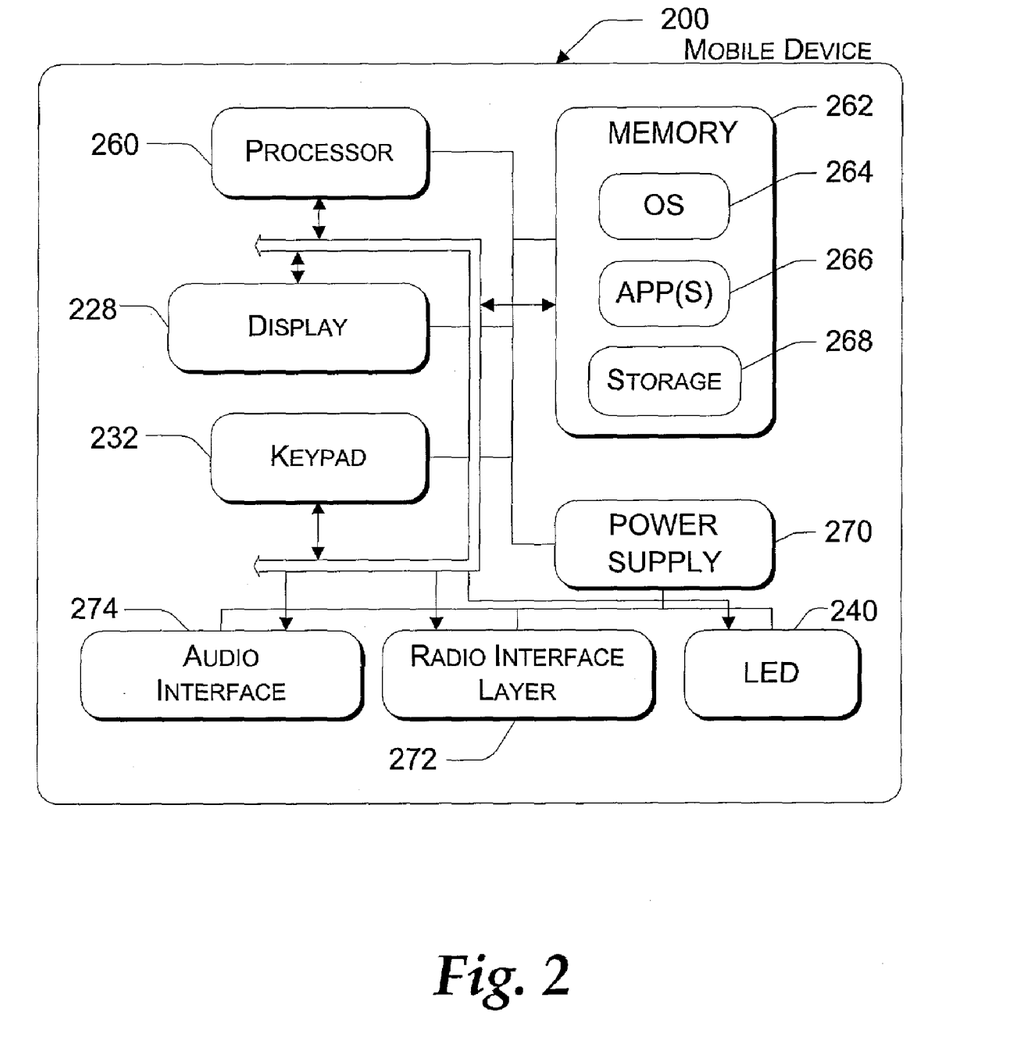
FIG. 2 illustrates an exemplary mobile device that may be used in one exemplary embodiment of the present invention.

The invention may be implemented in one or more components operating within a distributed computing network and a wireless computing network. The components may include software programs or applications operating on computing systems of various configurations. The following discussion first describes two general types of computing systems that can be used to implement the embodiments of the present invention. Those two general types of computing systems are illustrated in FIG. 1 and FIG. 2. Next, a detailed discussion of two illustrative implementations of the invention, illustrated in FIGS. 3–7, are described based on these two types of computing systems.

Illustrative Operating Environment

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

With reference to FIG. 2, one exemplary system for implementing the invention includes a mobile device, such as mobile device 200. The mobile device 200 has a processor 260, a memory 262, a display 228, and a keypad 232. The memory 262 generally includes both volatile memory (e.g., RAM) and non-volatile memory (e.g., ROM, Flash Memory, or the like). The mobile device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, instant messaging programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing program, instant messaging information used by an instant messaging program, and the like.

The mobile computing device 200 has a power supply 270, which may be implemented as one or more batteries. The power supply 270 might further include an external power source, such as an AC adapter or a powered docking cradle, that supplements or recharges the batteries.

The mobile computing device 200 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Illustrative Instant Messaging System

Figure 3:
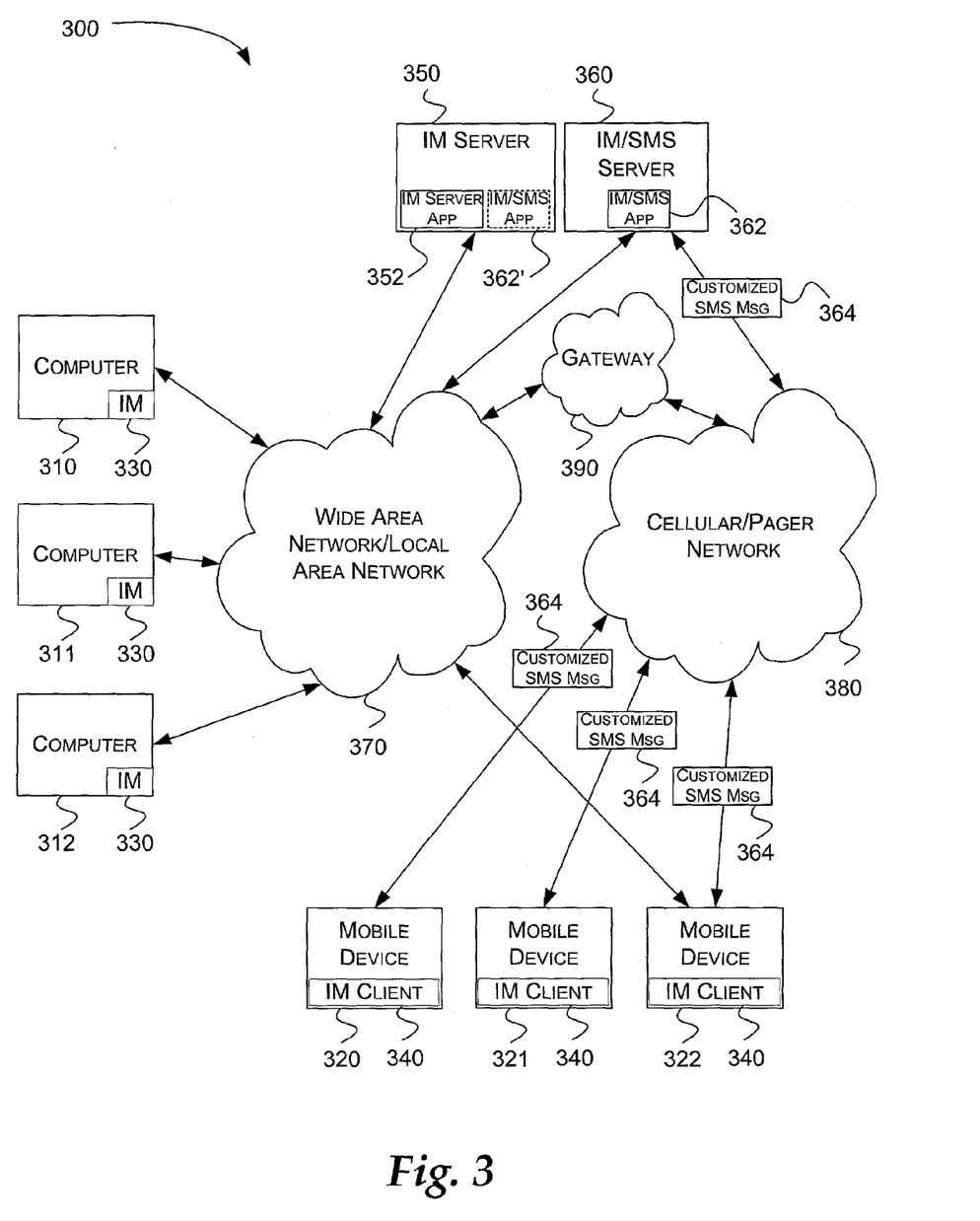
FIG. 3 is a functional block diagram of one exemplary instant messaging system as implemented using the computing device shown in FIG. 1 and the mobile device shown in FIG. 2.

FIG. 3 is a functional block diagram generally illustrating an instant messaging system 300 for enabling instant messaging between two computing systems, one of which is a mobile device 320–322. In one embodiment of the present invention, the two computing systems are a personal computer 310–312 and a mobile device 320–322. The personal computer 310–312 is a computing device such as the one described above in conjunction with FIG. 1, and the mobile device 320–322 is a mobile computing device such as the one described above in conjunction with FIG. 2. Each personal computer 310–312 includes an instant message application 330. In another embodiment of the present invention, the two computing systems may both be mobile devices 320–322, such as the one described above in conjunction with FIG. 2. In a further refinement of the invention, an instant message client application 340 resides on the mobile device 320–322.

In addition, the instant messaging system 300 includes an instant message (IM) server 350 and an IM/SMS server 360. The IM server 350 and the IM/SMS server 360 are both computing devices such as the one described above in conjunction with FIG. 1. IM server 350 is configured to perform instant messaging services between two or more personal computers 310–312. In one embodiment, IM server 350 is configured as a server, running Microsoft WINDOWS 2000 operating system, and running an IM server application 352. The IM server application 352 is configured to maintain a database of user aliases and a state for each of the user aliases. Briefly, the instant messaging service enables two or more personal computers 310–312 to create a private chat room and exchange private messages in real-time. There are several instant messaging services currently available, such as the MSN MESSENGER instant messaging service from Microsoft Corporation. These messaging services are known to those skilled in the art and will be described only to the extent necessary for understanding of the present invention.

In one embodiment, the IM/SMS server 360 is configured as a server, running Microsoft WINDOWS 2000 operating system, and running an IM/SMS translation application 362. In another embodiment, the IM/SMS translation application 362' (shown in phantom) is a software component that resides on the IM server 350. In addition, one skilled in the art will appreciate that the functionality provided by the IM/SMS translator application 362 may also be incorporated into the IM server application 352 without departing from the scope of the present invention. Briefly described, the IM/SMS translator application 362 is configured to alert the mobile device of an instant message and to support the exchange of instant messages with the mobile device.

The instant messaging system 300 includes a wide area network (WAN)/local area network (LAN) 370, a cellular/pager network 380, and a gateway 390. Typically, WAN/LAN 370 transmits information between computing devices. One example of a WAN is the Internet which connects millions of computers over a host of gateways, routers, switches, hubs, and the like. An example of a LAN is a network used to connect computers in a single office. A WAN may connect multiple LANs. Cellular/pager network 380 is a network responsible for delivering messages to and receiving messages from wireless devices. The cellular/pager network 380 may include both wireless and wired components. For example, cellular/pager network may include a cellular tower that is linked to a wired telephone network. Typically, the cellular tower carries communication to and from cell phones, long-distance communication links, and the like. One example of a messaging service that would use cellular/pager network 380 is the Short Messaging Service (SMS) system that delivers short text messages to and from mobile devices, such as mobile phones and pagers. In accordance with the present invention, cellular/pager network 380 delivers customized SMS messages 364 to and from mobile devices 320–322. The customized SMS messages 364 are created and processed by the IM/SMS translation application 362.

Gateway 390 routes messages between cellular/pager network 380 and WAN/LAN 370. For example, a computer user may send an email that is addressed to a pager. Gateway 390 provides a means for transporting the email from the WAN/LAN 370 to cellular/pager network 380. Conversely, a user with a device connected to a cellular network may be browsing the Web. Gateway 390 allows hyperlink text protocol (HTTP) messages to be transferred between WAN/LAN 370 and cellular/pager network 380.

In one exemplary embodiment of the present invention, IM server 350, IM/SMS server 360, and personal computers 310–312 are connected to WAN/LAN 370. Mobile devices 320–322 and IM/SMS server 360 are connected to cellular/pager network 380. In addition, mobile devices may be connected directly to WAN/LAN 370, as shown with mobile device 322. For example, mobile device 322 may have a network interface that allows it to plug directly into WAN/LAN 370. In other embodiments (not shown), IM server 350 and personal computers 310–312 may be connected to cellular/pager network 380.

Figure 4:
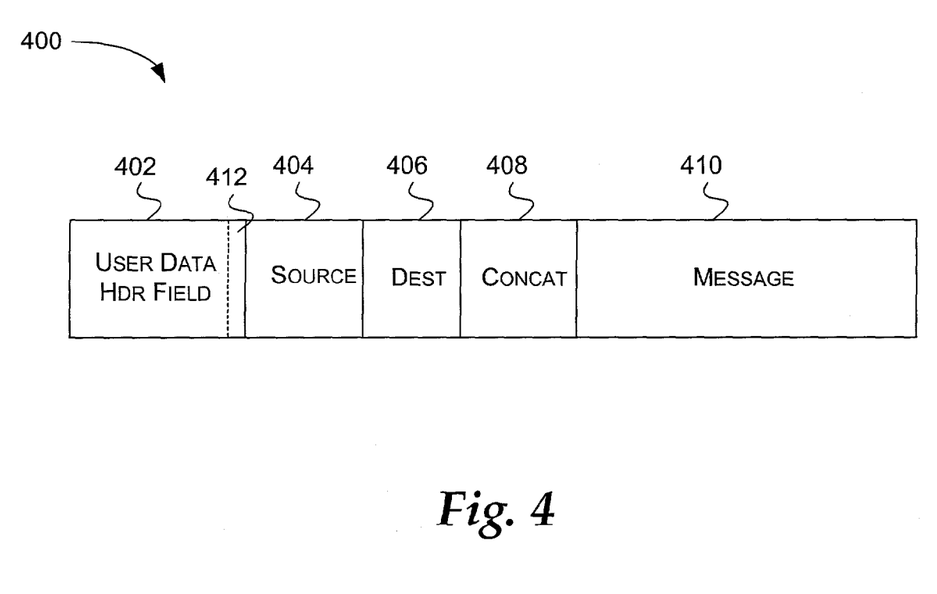
FIG. 4 is a graphical representation of salient portions of a customized SMS message in accordance with the present invention.

FIG. 4 is a graphical representation generally illustrating the salient portions of a sample customized SMS message 400 suitable for use in the present invention. As an overview, Short Messaging Service (SMS) is a service that allows short text/data messages to be sent and received on Global System for Mobile Communications (GSM) cellular networks. Generally, there are three types of SMS messages: GSM character set-encoded messages (effectively 7-bit encoded text), UCS2-encoded messages (Unicode encoded 16-bit text), and 8-bit binary-encoded messages. Typically, GSM-encoded messages and UCS2-encoded messages are textual and are displayed to the user by a messaging application as soon as they are received, whereas 8-bit binary-encoded messages are generally directed at providing device-specific information, such as device configuration messages.

As shown, the sample customized SMS message 400 includes a User Data Header field 402, a source field 404, a destination field 406, a concatenation field 408 and a message field 410. The User Data Header field 402 includes a message type field 412. In accordance with the present invention, the message type field 412 stores an identifier identifying the SMS message 400 as an IM SMS message.

Figure 5:
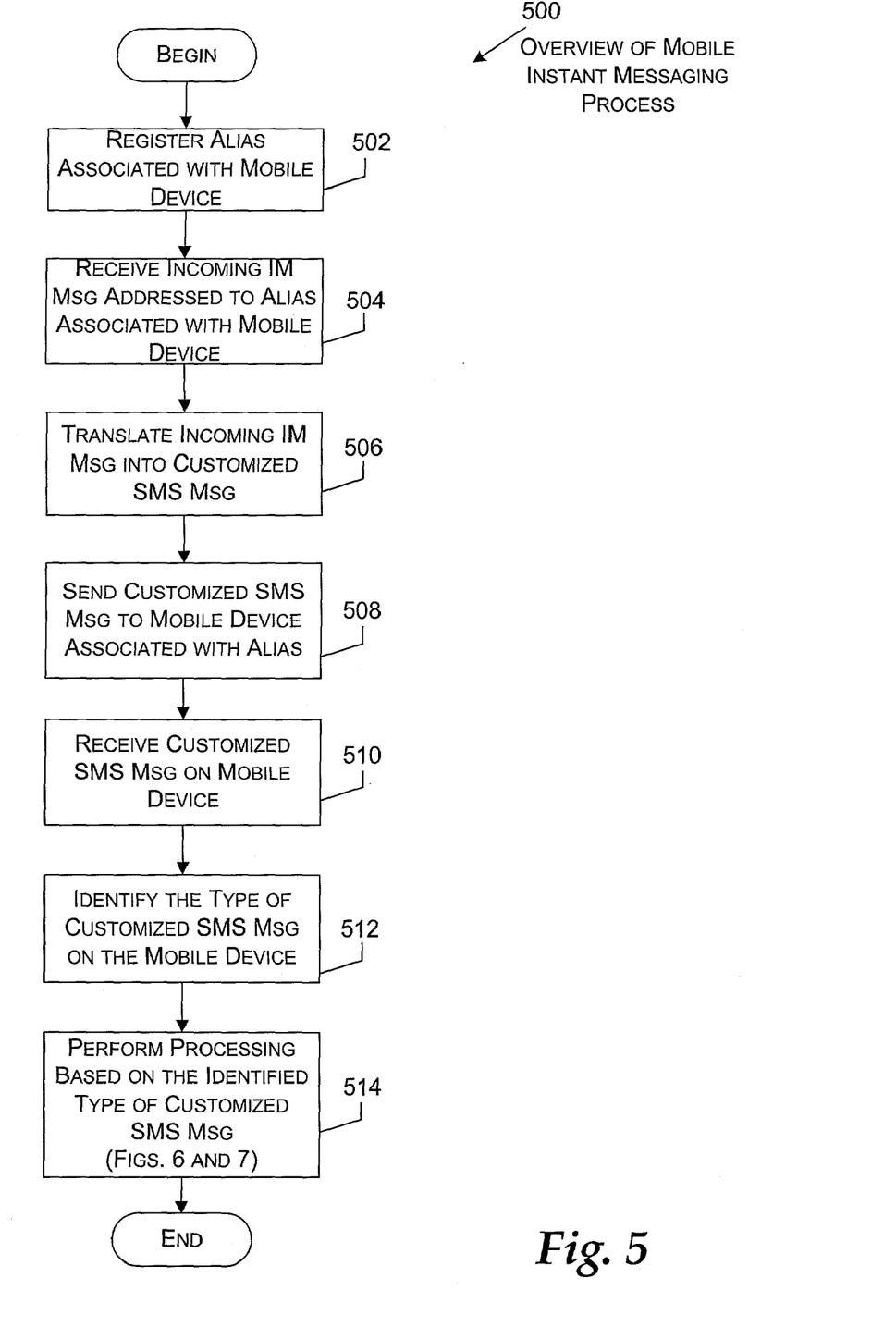
FIG. 5 is logical flow diagram generally illustrating an overview of a process for enabling instant messaging with a mobile device.

FIG. 5 is logical flow diagram generally illustrating an overview of a mobile instant messaging process 500 for enabling instant messaging on a mobile device. The process 500 begins at block 502, where a mobile user registers an alias with the instant messaging service. Registering an alias associates the alias with a mobile device. Typically, registering the alias is performed one time. As mentioned above, the instant messaging service maintains a list of aliases and their corresponding state in a database. The state corresponding to the alias for a mobile device will typically indicate offline. This offline state indicates to other IM aliases that the alias is not available for chatting. However, the instant messaging service allows an IM alias to send an IM message to an alias that appears offline.

At block 504, an incoming IM message addressed to the alias (i.e., recipient alias) associated with the mobile device is received. The incoming IM message is generated from another individual on a first computing device. The other individual also has an alias stored with the instant messaging service. Typically, IM messages are exchanged through persistent Internet connections between two individuals on their personal computers. However, with a mobile device, a persistent Internet connection is not typically connected. Upon recognizing that the recipient alias corresponds to the mobile device, processing proceeds to block 506.

At block 506, the incoming IM message is translated into a customized SMS message. As mentioned above, SMS messages are sent over the cellular network to mobile devices. Typically, the SMS messages are short text messages. The customized SMS message in accordance with the present invention leverages existing SMS technology by including a message type field. For this embodiment of the invention, the message type field identifies the SMS message as an IM message type, which indicates that the SMS message originated from an IM message. Processing continues at block 508.

At block 508, the customized SMS message is sent to the mobile device. In overview, the mobile device is typically in a "sleep" state unless actively engaged in some activity, such as a telephone call or using a Web browser. Even though the mobile device is in a "sleep" state, the mobile device may accept and receive SMS messages. Thus, at block 510, the mobile device receives the customized SMS message.

At block 512, the mobile device determines that the customized SMS message is not a standard SMS message, but is rather associated with an instant message. Processing continues at block 514.

Figure 6:
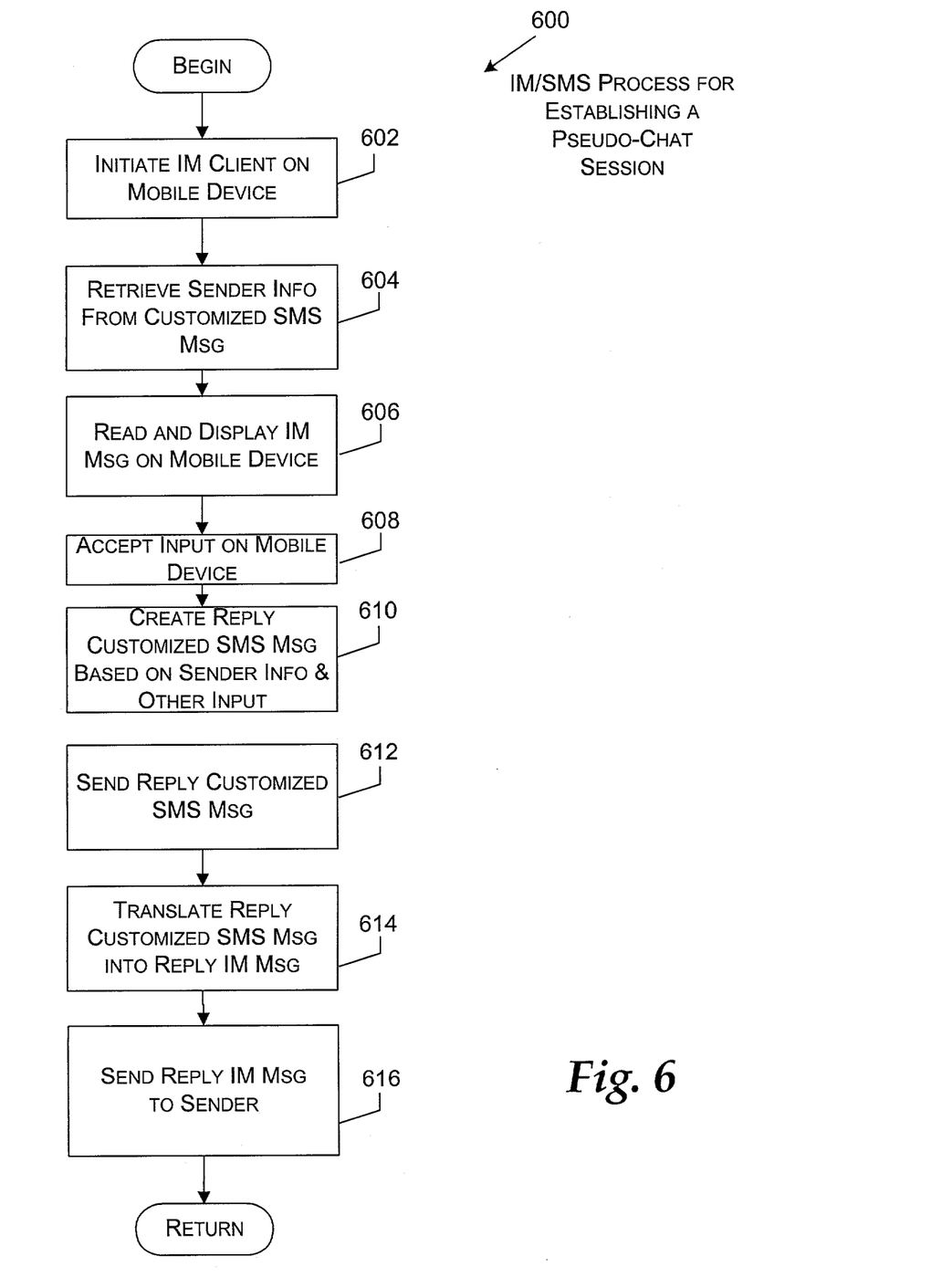
FIG. 6 is a logical flow diagram generally illustrating a process for establishing a pseudo-chat session that is suitable for use in FIG. 5.
Figure 7:
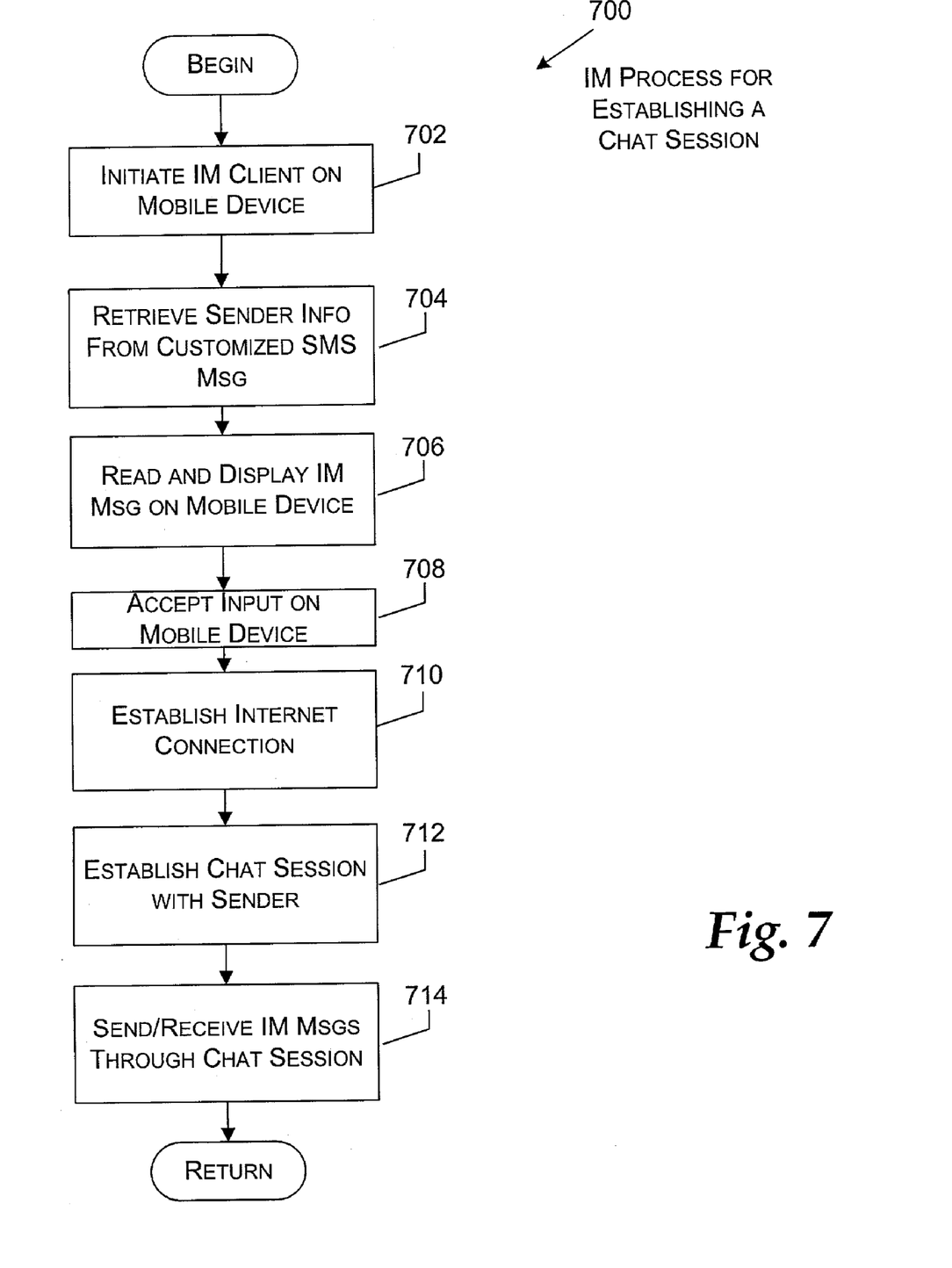
FIG. 7 is a logical flow diagram illustrating a process for establishing a chat session that is suitable for use in FIG. 5.

At block 514, additional processing is performed based on the type of customized SMS message. Two embodiments for enabling instant messaging on the mobile device are illustrated in FIGS. 6 and 7 and described below. Processing is then complete.

FIG. 6 is a logical flow diagram generally illustrating an IM/SMS process for establishing a pseudo-chat session between the mobile device and the first computing device over the cellular network using SMS. The IM/SMS process 600 is one embodiment of additional processing suitable for use in block 514 of FIG. 5. The IM/SMS process 600 begins at block 602, where the mobile device has already identified the type of customized SMS message. For the embodiment described below, the customized SMS message has been identified as an instant message type. Therefore, an IM client application is initiated on the mobile device. The IM client is initiated after determining the SMS message type so that battery power can be utilized more effectively.

At block 604, the IM client parses the customized SMS message and retrieves sender information. As will become apparent after reading the complete description of the invention, the first computing device (i.e., the sender) is unaware that instant messaging is being performed with a mobile user. To the sender's perspective, instant messaging is being performed between two personal computers using a persistent Internet connection.

At block 606, content of the customized SMS message is read and displayed on the mobile device for the mobile user. After reviewing the content, the mobile user may input information in response to the IM message. For example, the mobile user may select "reply" and type in a reply message using the input device associated with the mobile device. The mobile device accepts this input at block 608.

At block 610, the IM client creates a reply customized SMS message based on the sender information and input obtained above. The reply customized SMS message has a similar format as the customized SMS message that was received by the mobile device.

At block 612, the IM client sends the reply customized SMS message to the sender over the cellular network. The reply customized SMS message identifies the sender and includes an IM message indicator in the message type field. An IM/SMS application receives the reply customized SMS message and translates the reply customized SMS message into a reply IM message at block 614. At block 616, the reply IM message is sent to the sender through the Internet connection established with the instant messaging service for instant messaging. Processing is then complete. The first computing device and the mobile device may exchange additional instant messages using the process described above in FIGS. 5 and 6.

FIG. 7 is a logical flow diagram generally illustrating an IM process for establishing a chat session between the mobile device and the first computing device over an Internet connection. The IM process 700 is another embodiment of additional processing suitable for use in block 514 of FIG. 5. The IM process 700 begins at block 702, where the mobile device has already identified the type of customized SMS message. For the embodiment described below, the customized SMS message has been identified as an instant message type. Therefore, an IM client application is initiated on the mobile device. The IM client is initiated after determining the SMS message type so that battery power can be utilized more effectively.

At block 704, the IM client parses the customized SMS message and retrieves sender information. At block 706, content of the customized SMS message is read and displayed on the mobile device for the mobile user. After reviewing the content, the mobile user may input information in response to the IM message. For example, the mobile user may select "reply" and type in a reply message using the input device associated with the mobile device. The mobile device accepts this input at block 708.

The above processing is similar to the processing described above in FIG. 6. However, at block 710, instead of creating a reply customized SMS message based on the sender information and input, the IM client establishes an Internet connection with the sender. The Internet connection may be established through a wireless LAN, Global System for Mobiles (GSM), and the like. The Internet connection allows a seamless connection to the sender.

At block 712, the IM client establishes a chat session with the sender over the Internet connection. The sender and the mobile device may then exchange IM messages through the chat session until one or the other ends the chat session. Once the chat session is terminated, the processing described above in conjunction with FIGS. 5 and 7 needs to be performed again before another exchange of instant messages can occur. Processing is then complete.

Even though the above discussion describes the IM process for establishing a chat session between the mobile device and the first computing device over an Internet connection, the chat session may occur between two mobile devices without departing from the scope of the present invention. In this embodiment, the sending mobile device is connected via the Internet and acting in a similar fashion as a computing device.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A computer-implemented method for enabling instant messaging on a mobile device, comprising:
  receiving an incoming instant message from a first computing device that is destined for a mobile device;
  translating the incoming instant message into a customized message;
  sending the customized message to the mobile device;
  upon receiving the customized message on the mobile device, determining, by the mobile device, that the customized message originated from the incoming instant message and initiating processing with the first computing device based on the customized message, wherein initiating processing includes creating a reply-customized message and sending the reply customized message to an IM server computer;

translating, by the IM server computer, the reply customized message into a reply instant message that is sent to the first computing device; and selectively establishing a chat session for sending instant messages between the mobile device and the first computing device over an Internet connection.

2. The computer-implemented method of claim 1, wherein the customized message includes a Short Message Service message.

3. The computer-implemented method of claim 2, wherein the customized message is sent over a cellular network.

4. The computer-implemented method of claim 1, wherein the reply instant message is sent over an Internet connection to the first computing device.

5. The computer-implemented method of claim 1, further comprising establishing an Internet connection in response to receiving the customized message.

6. The computer-implemented method of claim 1, wherein initiating processing includes initiating an instant messaging client application on the mobile device.

7. The computer-implemented method of claim 1, wherein the instant message's intended recipient is offline when the message is sent.

8. An instant messaging system that enables instant messaging on a mobile device, the system comprising:
a mobile device; having a client application to selectively create a reply customized SMS message in response to user input on the mobile device and to send the reply customized SMS message through a cellular network;
a first computing device for sending an instant message to an alias associated with the mobile device; and
an instant message server for receiving the instant message and translating the instant message into a customized SMS message for delivery over a cellular network to the mobile device, wherein the instant message server translates a reply customized SMS messagefrom the mobile from the mobile device into a reply instant message and sends the reply instant message to the first computing device through an Internet connection;
wherein the mobile device receives the customized SMS message and and determines that the customized SMS message originated from the instant message sent from the first computing device.

9. The instant messaging system of claim 8, further comprising a client application residing on the mobile device that is configured to create an Internet connection and to establish a chat session with the first computing device over the Internet connection.

10. A mobile device, comprising:
a processor;
a display;
a memory into which a plurality of computer-executable instructions are loaded, the computer-executable instructions performing a method comprising:
receiving a customized SMS message;
determining, by the mobile device, that the customized SMS message originated from an instant message sent from a first computing device; and
initiating processing with the first computing device based on the customized SMS message, wherein initiating processing includes creating a reply-customized message and sending the reply customized message to an IM server computer;
translating, by the IM server computer, the reply customized message into a reply instant message that is sent to the first computing device; and
selectively establishing a chat session for sending instant message between the mobile device and the first computing device over an Internet connection.

11. A computer-readable medium encoded with computer-executable instructions for performing a method comprising:
receiving an incoming instant message from a first device;
detecting that the incoming instant message is destined for a mobile device;
translating the incoming instant message into a customized SMS message, wherein the instant message's intended recipient may appear to be offline;
sending the customized SMS message to the mobile device over a cellular network,
receiving from the IM server computer, a reply instant message that is derived from a reply message sent to an IM server computer from the mobile device in response to determining that the customized SMS message originated from the incoming instant message; and
selectively establishing a chat session for sending instant message between the mobile device and the first computing device over an Internet connection.

* * * * *

UNITED STATES PATENT AND TRADEMARK OFFICE
CERTIFICATE OF CORRECTION

PATENT NO. : 6,957,077 B2 Page 1 of 1
APPLICATION NO. : 10/140389
DATED : October 18, 2005
INVENTOR(S) : Joel P. Dehlin It is certified that error appears in the above-identified patent and that said Letters Patent is hereby corrected as shown below:

In column 9, line 19, in Claim 6, delete "claim 1,wherein" and insert -- claim 1, wherein --, therefor.

In column 9, line 27, in Claim 8, after "device" delete ";".

In column 9, line(s) 37-38, in Claim 8, delete "messagefrom the mobile" and insert -- message --, therefor.

In column 9, line 42, in Claim 8, after "message" delete "and".

In column 10, line 24, in Claim 10, delete "message" and insert -- messages --, therefor.

In column 10, line 43, in Claim 11, delete "message" and insert -- messages --, therefor.

Signed and Sealed this

Fourth Day of August, 2009

JOHN DOLL
*Acting Director of the United States Patent and Trademark Office*